United States Patent
Jain et al.

(10) Patent No.: US 9,195,854 B2
(45) Date of Patent: Nov. 24, 2015

(54) SYSTEM AND METHOD FOR CONTROLLING THE ON AND OFF STATE OF FEATURES AT RUNTIME

(71) Applicant: salesforce.com, inc., San Francisco, CA (US)

(72) Inventors: Samarpan Jain, San Francisco, CA (US); Reuben Cornel, San Francisco, CA (US)

(73) Assignee: salesforce.com, inc., San Francisco, CA (US)

(*) Notice: Subject to any disclaimer, the term of this patent is extended or adjusted under 35 U.S.C. 154(b) by 61 days.

(21) Appl. No.: 14/051,753

(22) Filed: Oct. 11, 2013

(65) Prior Publication Data

US 2014/0173720 A1 Jun. 19, 2014

Related U.S. Application Data

(60) Provisional application No. 61/739,111, filed on Dec. 19, 2012.

(51) Int. Cl.
*G06F 21/62* (2013.01)
*G06F 21/60* (2013.01)

(52) U.S. Cl.
CPC ............ *G06F 21/629* (2013.01); *G06F 21/604* (2013.01)

(58) Field of Classification Search
CPC ............................. G06F 21/604; G06F 21/629
See application file for complete search history.

(56) References Cited

U.S. PATENT DOCUMENTS

| | | | |
|---|---|---|---|
| 5,577,188 | A | 11/1996 | Zhu |
| 5,608,872 | A | 3/1997 | Schwartz et al. |
| 5,649,104 | A | 7/1997 | Carleton et al. |
| 5,715,450 | A | 2/1998 | Ambrose et al. |
| 5,761,419 | A | 6/1998 | Schwartz et al. |
| 5,819,038 | A | 10/1998 | Carleton et al. |
| 5,821,937 | A | 10/1998 | Tonelli et al. |
| 5,831,610 | A | 11/1998 | Tonelli et al. |
| 5,873,096 | A | 2/1999 | Lim et al. |
| 5,918,159 | A | 6/1999 | Fomukong et al. |
| 5,963,953 | A | 10/1999 | Cram et al. |
| 6,092,083 | A | 7/2000 | Brodersen et al. |
| 6,169,534 | B1 | 1/2001 | Raffel et al. |
| 6,178,425 | B1 | 1/2001 | Brodersen et al. |
| 6,189,011 | B1 | 2/2001 | Lim et al. |
| 6,216,135 | B1 | 4/2001 | Brodersen et al. |
| 6,233,617 | B1 | 5/2001 | Rothwein et al. |

(Continued)

OTHER PUBLICATIONS

JavaScript., "Javascript If . . . Else Statements", May 2012 http://web.archive.org/web/20120511004333/http://www.w3schools.com/js/js_if_else.aspLi.*

(Continued)

*Primary Examiner* — Kaveh Abrishamkar
*Assistant Examiner* — Carlos M De Jesus Lassala
(74) *Attorney, Agent, or Firm* — Ingrassia Fisher & Lorenz, P.C.

(57) ABSTRACT

Methods and systems are provided for turning on and off features at run time. The method includes providing a unique enabling predicate (e.g., an "if enabled" statement) for one or more executable features (blocks of code), configuring a permissions library, and caching the configured permissions library. The method further includes interrogating the cache with the first "if enabled" predicate, executing the block of code (feature) if the cache yields "true" for the requesting user, and not executing the code block if the cache yields "false" for the requesting user.

13 Claims, 5 Drawing Sheets

(56) References Cited

U.S. PATENT DOCUMENTS

| | | | |
|---|---|---|---|
| 6,266,669 B1 | 7/2001 | Brodersen et al. | |
| 6,295,530 B1 | 9/2001 | Ritchie et al. | |
| 6,324,568 B1 | 11/2001 | Diec et al. | |
| 6,324,693 B1 | 11/2001 | Brodersen et al. | |
| 6,336,137 B1 | 1/2002 | Lee et al. | |
| D454,139 S | 3/2002 | Feldcamp et al. | |
| 6,367,077 B1 | 4/2002 | Brodersen et al. | |
| 6,393,605 B1 | 5/2002 | Loomans | |
| 6,405,220 B1 | 6/2002 | Brodersen et al. | |
| 6,434,550 B1 | 8/2002 | Warner et al. | |
| 6,446,089 B1 | 9/2002 | Brodersen et al. | |
| 6,535,909 B1 | 3/2003 | Rust | |
| 6,549,908 B1 | 4/2003 | Loomans | |
| 6,553,563 B2 | 4/2003 | Ambrose et al. | |
| 6,560,461 B1 | 5/2003 | Fomukong et al. | |
| 6,574,635 B2 | 6/2003 | Stauber et al. | |
| 6,577,726 B1 | 6/2003 | Huang et al. | |
| 6,601,087 B1 | 7/2003 | Zhu et al. | |
| 6,604,117 B2 | 8/2003 | Lim et al. | |
| 6,604,128 B2 | 8/2003 | Diec | |
| 6,609,150 B2 | 8/2003 | Lee et al. | |
| 6,621,834 B1 | 9/2003 | Scherpbier et al. | |
| 6,654,032 B1 | 11/2003 | Zhu et al. | |
| 6,665,648 B2 | 12/2003 | Brodersen et al. | |
| 6,665,655 B1 | 12/2003 | Warner et al. | |
| 6,684,438 B2 | 2/2004 | Brodersen et al. | |
| 6,711,565 B1 | 3/2004 | Subramaniam et al. | |
| 6,724,399 B1 | 4/2004 | Katchour et al. | |
| 6,728,702 B1 | 4/2004 | Subramaniam et al. | |
| 6,728,960 B1 | 4/2004 | Loomans et al. | |
| 6,732,095 B1 | 5/2004 | Warshavsky et al. | |
| 6,732,100 B1 | 5/2004 | Brodersen et al. | |
| 6,732,111 B2 | 5/2004 | Brodersen et al. | |
| 6,754,681 B2 | 6/2004 | Brodersen et al. | |
| 6,763,351 B1 | 7/2004 | Subramaniam et al. | |
| 6,763,501 B1 | 7/2004 | Zhu et al. | |
| 6,768,904 B2 | 7/2004 | Kim | |
| 6,782,383 B2 | 8/2004 | Subramaniam et al. | |
| 6,804,330 B1 | 10/2004 | Jones et al. | |
| 6,826,565 B2 | 11/2004 | Ritchie et al. | |
| 6,826,582 B1 | 11/2004 | Chatterjee et al. | |
| 6,826,745 B2 | 11/2004 | Coker | |
| 6,829,655 B1 | 12/2004 | Huang et al. | |
| 6,842,748 B1 | 1/2005 | Warner et al. | |
| 6,850,895 B2 | 2/2005 | Brodersen et al. | |
| 6,850,949 B2 | 2/2005 | Warner et al. | |
| 7,062,502 B1 | 6/2006 | Kesler | |
| 7,330,971 B1 * | 2/2008 | Kukreja et al. | 713/168 |
| 7,340,411 B2 | 3/2008 | Cook | |
| 7,401,094 B1 | 7/2008 | Kesler | |
| 7,412,455 B2 | 8/2008 | Dillon | |
| 7,620,655 B2 | 11/2009 | Larsson et al. | |
| 7,650,505 B1 * | 1/2010 | Masurkar | 713/176 |
| 7,698,160 B2 | 4/2010 | Beaven et al. | |
| 8,082,301 B2 | 12/2011 | Ahlgren et al. | |
| 8,095,413 B1 | 1/2012 | Beaven | |
| 8,095,594 B2 | 1/2012 | Beaven et al. | |
| 8,275,836 B2 | 9/2012 | Beaven et al. | |
| 2001/0044791 A1 | 11/2001 | Richter et al. | |
| 2002/0072951 A1 | 6/2002 | Lee et al. | |
| 2002/0082892 A1 | 6/2002 | Raffel | |
| 2002/0129352 A1 | 9/2002 | Brodersen et al. | |
| 2002/0133459 A1 * | 9/2002 | Polk et al. | 705/40 |
| 2002/0140731 A1 | 10/2002 | Subramaniam et al. | |
| 2002/0143997 A1 | 10/2002 | Huang et al. | |
| 2002/0162090 A1 | 10/2002 | Parnell et al. | |
| 2002/0165742 A1 | 11/2002 | Robbins | |
| 2003/0004971 A1 | 1/2003 | Gong | |
| 2003/0018705 A1 | 1/2003 | Chen et al. | |
| 2003/0018830 A1 | 1/2003 | Chen et al. | |
| 2003/0066031 A1 | 4/2003 | Laane et al. | |
| 2003/0066032 A1 | 4/2003 | Ramachandran et al. | |
| 2003/0069936 A1 | 4/2003 | Warner et al. | |
| 2003/0070000 A1 | 4/2003 | Coker et al. | |
| 2003/0070004 A1 | 4/2003 | Mukundan et al. | |
| 2003/0070005 A1 | 4/2003 | Mukundan et al. | |
| 2003/0074418 A1 | 4/2003 | Coker et al. | |
| 2003/0120675 A1 | 6/2003 | Stauber et al. | |
| 2003/0151633 A1 | 8/2003 | George et al. | |
| 2003/0159136 A1 | 8/2003 | Huang et al. | |
| 2003/0187921 A1 | 10/2003 | Diec et al. | |
| 2003/0189600 A1 | 10/2003 | Gune et al. | |
| 2003/0204427 A1 | 10/2003 | Gune et al. | |
| 2003/0206192 A1 | 11/2003 | Chen et al. | |
| 2003/0225730 A1 | 12/2003 | Warner et al. | |
| 2004/0001092 A1 | 1/2004 | Rothwein et al. | |
| 2004/0010489 A1 | 1/2004 | Rio et al. | |
| 2004/0015981 A1 | 1/2004 | Coker et al. | |
| 2004/0027388 A1 | 2/2004 | Berg et al. | |
| 2004/0128001 A1 | 7/2004 | Levin et al. | |
| 2004/0186860 A1 | 9/2004 | Lee et al. | |
| 2004/0193510 A1 | 9/2004 | Catahan et al. | |
| 2004/0199489 A1 | 10/2004 | Barnes-Leon et al. | |
| 2004/0199536 A1 | 10/2004 | Barnes Leon et al. | |
| 2004/0199543 A1 | 10/2004 | Braud et al. | |
| 2004/0249854 A1 | 12/2004 | Barnes-Leon et al. | |
| 2004/0260534 A1 | 12/2004 | Pak et al. | |
| 2004/0260659 A1 | 12/2004 | Chan et al. | |
| 2004/0268299 A1 | 12/2004 | Lei et al. | |
| 2005/0050555 A1 | 3/2005 | Exley et al. | |
| 2005/0091098 A1 | 4/2005 | Brodersen et al. | |
| 2008/0249972 A1 | 10/2008 | Dillon | |
| 2009/0063414 A1 | 3/2009 | White et al. | |
| 2009/0327102 A1 * | 12/2009 | Maniar et al. | 705/28 |
| 2011/0321159 A1 * | 12/2011 | Nestler et al. | 726/21 |

OTHER PUBLICATIONS

Li., "Towards a Group-Based RBAC Model and Decentralized User-Role Administration" Jun. 2008 http://ieeexplore.ieee.org/xpls/abs_all.jsp?arnumber=4577824&tag=1.*

If., "If Statement", Aug. 2001, pp. 1-7 http://web.engr.oregonstate.edu/~traylor/ece474/vhdl_lectures/if_and_relational_ops.pdf.*

Zhao., "A Role-Based Access Control Security Model for Workflow Management System in an E-healthcare Enterprise", fall/2008, pp. 1-81, http://www.cis.famu.edu/~hchi/langzhao_Thesis_final1.pdf.*

Hazlewood., "The New RBAC: Resource-Based Access Control", Jan. 2012, pp. 1-7, https://stormpath.com/blog/new-rbac-resource-based-access-control/.*

Hoy, "Role-Based Administration in System Center 2012 Configuration Manager", Mar. 2012, pp. 1-6, http://blogs.technet.eom/b/hhoy/archive/2012/03/07/role-based-administration-in-system-center-2012-configuration-manager.aspx.*

* cited by examiner

SYSTEM AND METHOD FOR CONTROLLING THE ON AND OFF STATE OF FEATURES AT RUNTIME

CROSS-REFERENCE TO RELATED APPLICATION

This application claims the benefit of U.S. provisional patent application Ser. No. 61/739,111, filed Dec. 19, 2012, the entire contents of which are incorporated herein by this reference.

TECHNICAL FIELD

Embodiments of the subject matter described herein relate generally to computer systems and applications for controlling the execution of core logic, and more particularly to the use of an administrative control panel for configuring and caching permissions for use at run time.

BACKGROUND

Software development is evolving away from the client-server model toward network-based processing systems that provide access to data and services via the Internet or other networks. In contrast to traditional systems that host networked applications on dedicated server hardware, a "cloud" computing model allows applications to be provided over the network "as a service" supplied by an infrastructure provider. The infrastructure provider typically abstracts the underlying hardware and other resources used to deliver a customer-developed application so that the customer no longer needs to operate and support dedicated server hardware. The cloud computing model can often provide substantial cost savings to the customer over the life of the application because the customer no longer needs to provide dedicated network infrastructure, electrical and temperature controls, physical security and other logistics in support of dedicated server hardware.

Multi-tenant cloud-based architectures have been developed to improve collaboration, integration, and community-based cooperation between customer tenants without sacrificing data security. Generally speaking, multi-tenancy refers to a system where a single hardware and software platform simultaneously supports multiple user groups (also referred to as "organizations" or "tenants") from a common data storage element (also referred to as a "multi-tenant database"). The multi-tenant design provides a number of advantages over conventional server virtualization systems. First, the multi-tenant platform operator can often make improvements to the platform based upon collective information from the entire tenant community. Additionally, because all users in the multi-tenant environment execute applications within a common processing space, it is relatively easy to grant or deny access to specific sets of data for any user within the multi-tenant platform, thereby improving collaboration and integration between applications and the data managed by the various applications. The multi-tenant architecture therefore allows convenient and cost effective sharing of similar application feature software s between multiple sets of users.

Both within and outside of on-demand or multi-tenant computing environments, the execution of business logic at run time often involves unnecessary database and memory calls. In addition, developers typically embed extensive "if—then—else" and other logic into core logic to define which user groups are authorized to execute particular logic blocks. Presently known processes for defining permissions is unnecessarily cumbersome and resource consuming.

Systems and methods are thus needed which overcome the foregoing shortcomings.

BRIEF DESCRIPTION OF THE DRAWING FIGURES

A more complete understanding of the subject matter may be derived by referring to the detailed description and claims when considered in conjunction with the following figures, wherein like reference numbers refer to similar elements throughout the figures.

Figure 4:
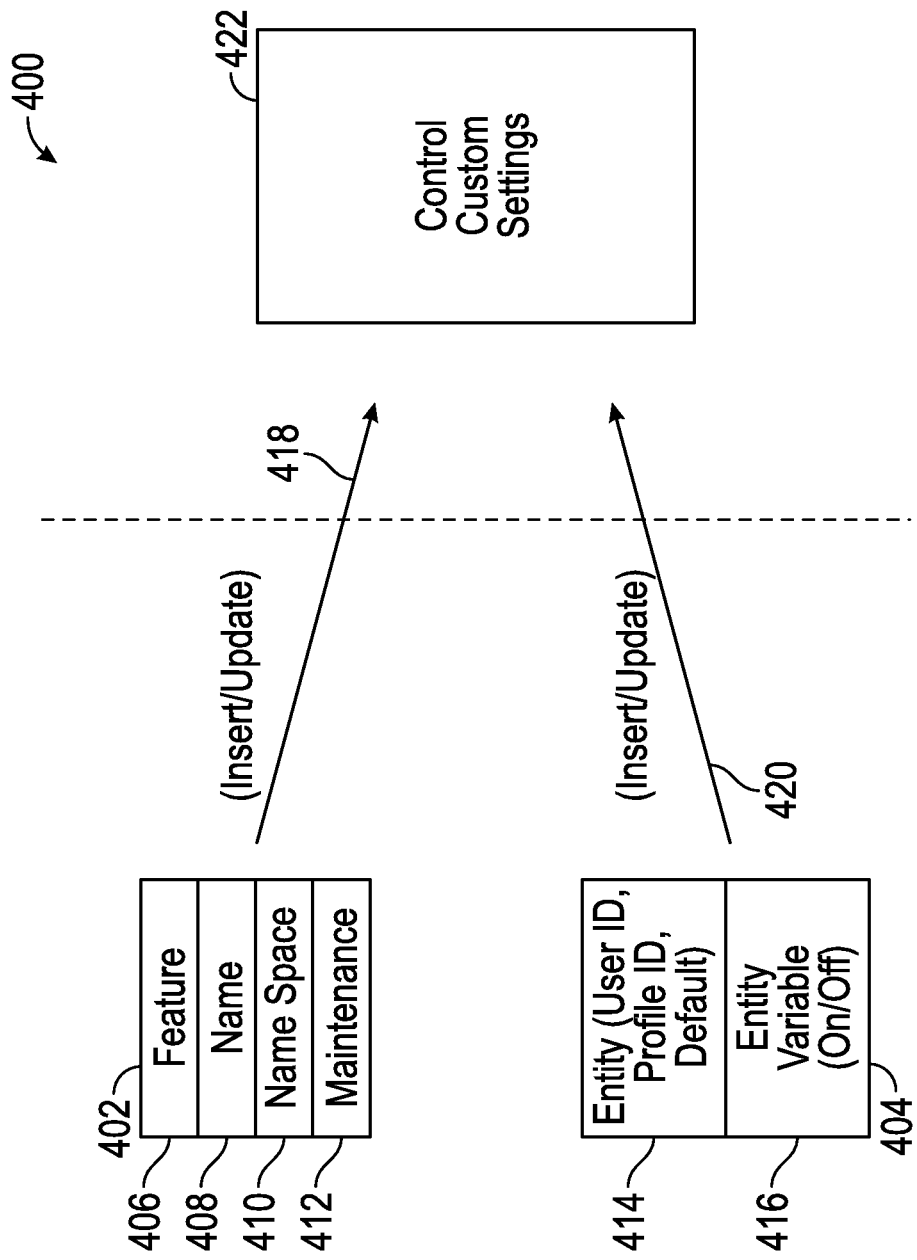
Figure 5:
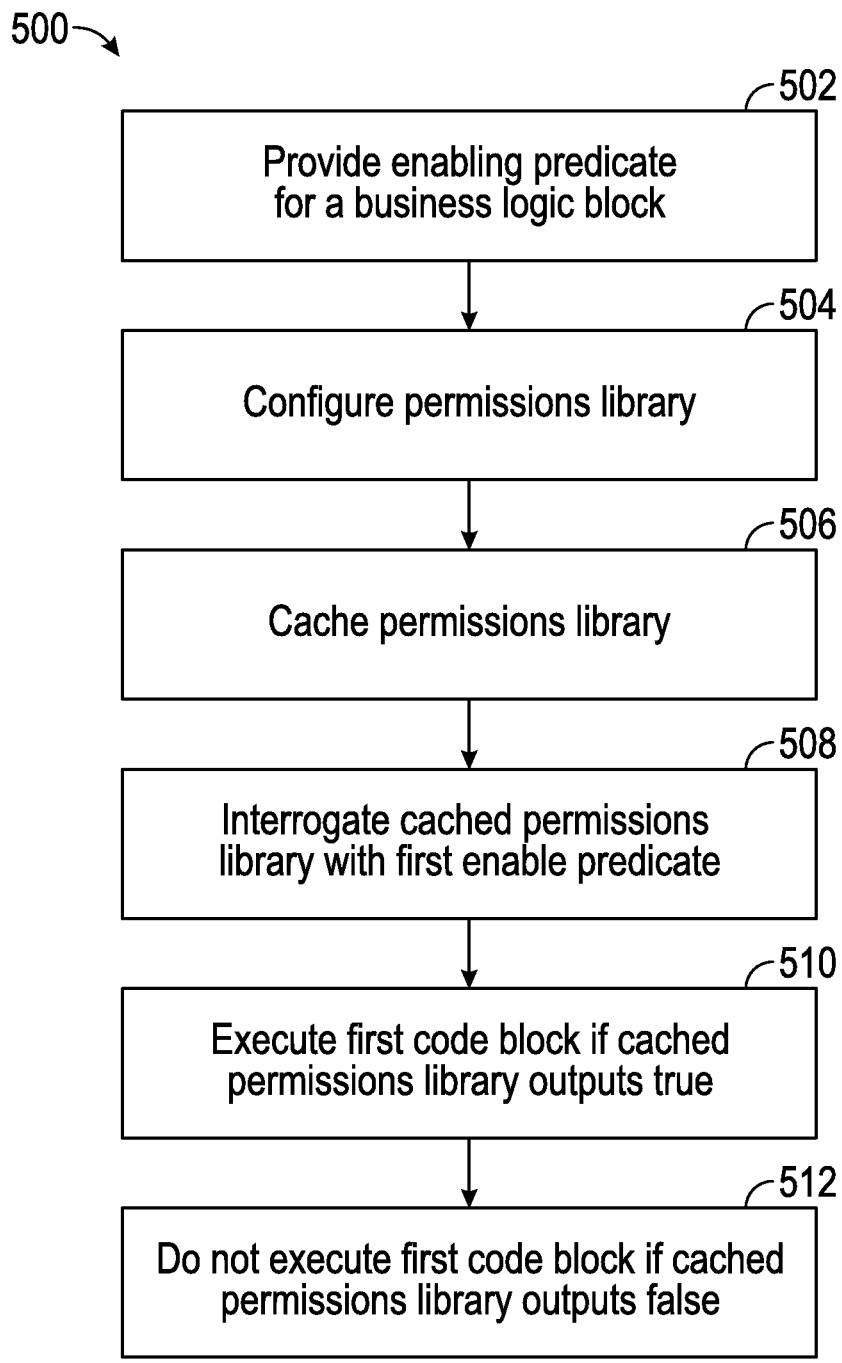

FIG. 4 is a schematic block diagram of an administrative control panel for configuring permissions for user groups and storing them in a control custom settings cache in accordance with an embodiment; and FIG. 5 is a flow diagram of an exemplary method of a method for controlling the execution of core logic for different user groups using pre-configured cached permissions in accordance with an embodiment.

DETAILED DESCRIPTION

Embodiments of the subject matter described herein generally relate to systems and methods for controlling the run time execution of business logic through the use of an administrative control panel for pre-configuring and caching permissions.

Figure 1:
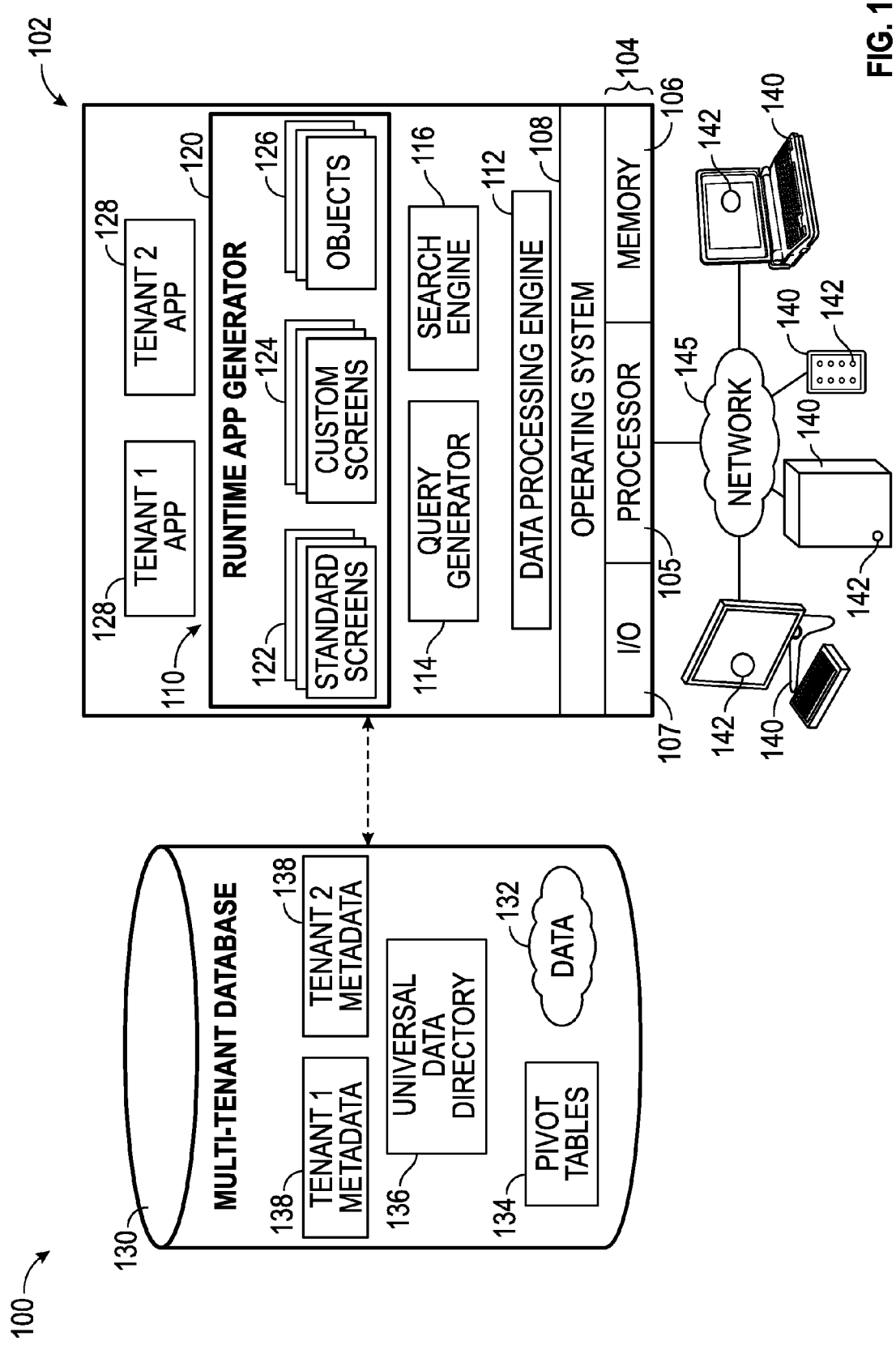
FIG. 1 is a schematic block diagram of a multi-tenant computing environment in accordance with an embodiment.

Turning now to FIG. 1, an exemplary cloud based solution may be implemented in the context of a multi-tenant system 100 including a server 102 that supports applications 128 based upon data 132 from a database 130 that may be shared between multiple tenants, organizations, or enterprises, referred to herein as a multi-tenant database. Data and services generated by the various applications 128 are provided via a network 145 to any number of client devices 140, such as desk tops, laptops, tablets, smartphones, Google Glass™, and any other computing device implemented in an automobile, aircraft, television, or other business or consumer electronic device or system, including web clients.

In addition to the foregoing "dedicated" syncing clients, the present disclosure also contemplates the automatic sharing of data and files into applications, such as Microsoft Word™, such that saving a document in Word would automatically sync the document to the collaboration cloud. In an embodiment, each client device, application, or web client is suitably configured to run a client application 142, such as the Chatterbox file synchronization module or other application for performing similar functions, as described in greater detail below.

An alternative vector into the automatic syncing and sharing may be implemented by an application protocol interface (API), either in lieu of or in addition to the client application 142. In this way, a developer may create custom applications/ interfaces to drive the sharing of data and/or files (and receive updates) with the same collaboration benefits provided by the client application 142.

Each application 128 is suitably generated at run-time (or on-demand) using a common application platform 110 that securely provides access to the data 132 in the database 130 for each of the various tenant organizations subscribing to the service cloud 100. In accordance with one non-limiting example, the service cloud 100 is implemented in the form of an on-demand multi-tenant customer relationship management (CRM) system that can support any number of authenticated users for a plurality of tenants.

As used herein, a "tenant" or an "organization" should be understood as referring to a group of one or more users (typically employees) that shares access to common subset of the data within the multi-tenant database 130. In this regard, each tenant includes one or more users and/or groups associated with, authorized by, or otherwise belonging to that respective tenant. Stated another way, each respective user within the multi-tenant system 100 is associated with, assigned to, or otherwise belongs to a particular one of the plurality of enterprises supported by the system 100.

Each enterprise tenant may represent a company, corporate department, business or legal organization, and/or any other entities that maintain data for particular sets of users (such as their respective employees or customers) within the multi-tenant system 100. Although multiple tenants may share access to the server 102 and the database 130, the particular data and services provided from the server 102 to each tenant can be securely isolated from those provided to other tenants. The multi-tenant architecture therefore allows different sets of users to share functionality and hardware resources without necessarily sharing any of the data 132 belonging to or otherwise associated with other organizations.

The multi-tenant database 130 may be a repository or other data storage system capable of storing and managing the data 132 associated with any number of tenant organizations. The database 130 may be implemented using conventional database server hardware. In various embodiments, the database 130 shares processing hardware 104 with the server 102. In other embodiments, the database 130 is implemented using separate physical and/or virtual database server hardware that communicates with the server 102 to perform the various functions described herein.

In an exemplary embodiment, the database 130 includes a database management system or other equivalent software capable of determining an optimal query plan for retrieving and providing a particular subset of the data 132 to an instance of application (or virtual application) 128 in response to a query initiated or otherwise provided by an application 128, as described in greater detail below. The multi-tenant database 130 may alternatively be referred to herein as an on-demand database, in that the database 130 provides (or is available to provide) data at run-time to on-demand virtual applications 128 generated by the application platform 110, as described in greater detail below.

In practice, the data 132 may be organized and formatted in any manner to support the application platform 110. In various embodiments, the data 132 is suitably organized into a relatively small number of large data tables to maintain a semi-amorphous "heap"-type format. The data 132 can then be organized as needed for a particular virtual application 128. In various embodiments, conventional data relationships are established using any number of pivot tables 134 that establish indexing, uniqueness, relationships between entities, and/or other aspects of conventional database organization as desired. Further data manipulation and report formatting is generally performed at run-time using a variety of metadata constructs. Metadata within a universal data directory (UDD) 136, for example, can be used to describe any number of forms, reports, workflows, user access privileges, business logic and other constructs that are common to multiple tenants.

Tenant-specific formatting, functions and other constructs may be maintained as tenant-specific metadata 138 for each tenant, as desired. Rather than forcing the data 132 into an inflexible global structure that is common to all tenants and applications, the database 130 is organized to be relatively amorphous, with the pivot tables 134 and the metadata 138 providing additional structure on an as-needed basis. To that end, the application platform 110 suitably uses the pivot tables 134 and/or the metadata 138 to generate "virtual" components of the virtual applications 128 to logically obtain, process, and present the relatively amorphous data 132 from the database 130.

The server 102 may be implemented using one or more actual and/or virtual computing systems that collectively provide the dynamic application platform 110 for generating the virtual applications 128. For example, the server 102 may be implemented using a cluster of actual and/or virtual servers operating in conjunction with each other, typically in association with conventional network communications, cluster management, load balancing and other features as appropriate. The server 102 operates with any sort of conventional processing hardware 104, such as a processor 105, memory 106, input/output features 107 and the like. The input/output features 107 generally represent the interface(s) to networks (e.g., to the network 145, or any other local area, wide area or other network), mass storage, display devices, data entry devices and/or the like.

The processor 105 may be implemented using any suitable processing system, such as one or more processors, controllers, microprocessors, microcontrollers, processing cores and/or other computing resources spread across any number of distributed or integrated systems, including any number of "cloud-based" or other virtual systems. The memory 106 represents any non-transitory short or long term storage or other computer-readable media capable of storing programming instructions for execution on the processor 105, including any sort of random access memory (RAM), read only memory (ROM), flash memory, magnetic or optical mass storage, and/or the like. The computer-executable programming instructions, when read and executed by the server 102 and/or processor 105, cause the server 102 and/or processor 105 to create, generate, or otherwise facilitate the application platform 110 and/or virtual applications 128 and perform one or more additional tasks, operations, functions, and/or processes described herein. It should be noted that the memory 106 represents one suitable implementation of such computer-readable media, and alternatively or additionally, the server 102 could receive and cooperate with external computer-readable media that is realized as a portable or mobile component or platform, e.g., a portable hard drive, a USB flash drive, an optical disc, or the like.

The application platform 110 is any sort of software application or other data processing engine that generates the virtual applications 128 that provide data and/or services to the client devices 140. In a typical embodiment, the application platform 110 gains access to processing resources, communications interfaces and other features of the processing hardware 104 using any sort of conventional or proprietary operating system 108. The virtual applications 128 are typically generated at run-time in response to input received from the client devices 140. For the illustrated embodiment, the application platform 110 includes a bulk data processing engine 112, a query generator 114, a search engine 116 that provides text indexing and other search functionality, and a runtime application generator 120. Each of these features may be implemented as a separate process or other module, and many equivalent embodiments could include different and/or additional features, components or other modules as desired.

The runtime application generator 120 dynamically builds and executes the virtual applications 128 in response to specific requests received from the client devices 140. The virtual applications 128 are typically constructed in accordance with the tenant-specific metadata 138, which describes the particular tables, reports, interfaces and/or other features of the particular application 128. In various embodiments, each virtual application 128 generates dynamic web content that can be served to a browser or other client program 142 associated with its client device 140, as appropriate.

The runtime application generator 120 suitably interacts with the query generator 114 to efficiently obtain multi-tenant data 132 from the database 130 as needed in response to input queries initiated or otherwise provided by users of the client devices 140. In a typical embodiment, the query generator 114 considers the identity of the user requesting a particular function (along with the user's associated tenant), and then builds and executes queries to the database 130 using system-wide metadata 136, tenant specific metadata 138, pivot tables 134, and/or any other available resources. The query generator 114 in this example therefore maintains security of the common database 130 by ensuring that queries are consistent with access privileges granted to the user and/or tenant that initiated the request.

With continued reference to FIG. 1, the data processing engine 112 performs bulk processing operations on the data 132 such as uploads or downloads, updates, online transaction processing, and/or the like. In many embodiments, less urgent bulk processing of the data 132 can be scheduled to occur as processing resources become available, thereby giving priority to more urgent data processing by the query generator 114, the search engine 116, the virtual applications 128, etc.

In exemplary embodiments, the application platform 110 is utilized to create and/or generate data-driven virtual applications 128 for the tenants that they support. Such virtual applications 128 may make use of interface features such as custom (or tenant-specific) screens 124, standard (or universal) screens 122 or the like. Any number of custom and/or standard objects 126 may also be available for integration into tenant-developed virtual applications 128. As used herein, "custom" should be understood as meaning that a respective object or application is tenant-specific (e.g., only available to users associated with a particular tenant in the multi-tenant system) or user-specific (e.g., only available to a particular subset of users within the multi-tenant system), whereas "standard" or "universal" applications or objects are available across multiple tenants in the multi-tenant system.

The data 132 associated with each virtual application 128 is provided to the database 130, as appropriate, and stored until it is requested or is otherwise needed, along with the metadata 138 that describes the particular features (e.g., reports, tables, functions, objects, fields, formulas, code, etc.) of that particular virtual application 128. For example, a virtual application 128 may include a number of objects 126 accessible to a tenant, wherein for each object 126 accessible to the tenant, information pertaining to its object type along with values for various fields associated with that respective object type are maintained as metadata 138 in the database 130. In this regard, the object type defines the structure (e.g., the formatting, functions and other constructs) of each respective object 126 and the various fields associated therewith.

Still referring to FIG. 1, the data and services provided by the server 102 can be retrieved using any sort of personal computer, mobile telephone, tablet or other network-enabled client device 140 on the network 145. In an exemplary embodiment, the client device 140 includes a display device, such as a monitor, screen, or another conventional electronic display capable of graphically presenting data and/or information retrieved from the multi-tenant database 130, as described in greater detail below.

Typically, the user operates a conventional browser application or other client program 142 executed by the client device 140 to contact the server 102 via the network 145 using a networking protocol, such as the hypertext transport protocol (HTTP) or the like. The user typically authenticates his or her identity to the server 102 to obtain a session identifier ("SessionID") that identifies the user in subsequent communications with the server 102. When the identified user requests access to a virtual application 128, the runtime application generator 120 suitably creates the application at run time based upon the metadata 138, as appropriate. However, if a user chooses to manually upload an updated file (through either the web based user interface or through an API), it will also be shared automatically with all of the users/devices that are designated for sharing.

As noted above, the virtual application 128 may contain Java, ActiveX, or other content that can be presented using conventional client software running on the client device 140; other embodiments may simply provide dynamic web or other content that can be presented and viewed by the user, as desired. As described in greater detail below, the query generator 114 suitably obtains the requested subsets of data 132 from the database 130 as needed to populate the tables, reports or other features of the particular virtual application 128.

In various embodiments, virtual application 128 may include tools which allow individual tenants to customize applications using the Apex™ platform available from Salesforce.com, Inc., The Landmark @ One Market Street, Suite 300, San Francisco, Calif. 94105. Customizing applications may include, for example, writing custom objects, custom fields, business logic and processes, and defining custom triggers. An exemplary custom object such as "contacts" may be used by various departments within an organization (e.g., accounting, finance, marketing, and the like). In presently known systems, when a developer desires to configure or modify business logic or triggering behavior associated with a custom object for a particular user group, a code change is typically required. This can be cumbersome, and may impact governor limits (e.g., runtime query quotas) for other users and/or groups using the same shared object.

In accordance with various embodiments, application 128 may include an administrator control panel for defining features (e.g., name, namespace, maintenance) and for defining the on/off state of various entities (e.g., userid, profileid, default), and for storing the data in a cached hash for use at run time. In this way, the "if/else" statements typically embedded within the business logic may be reduced down to a simple "if enabled" predicate built on top of each business logic block. If the result of the "if enabled" query is true (based on interrogating the control custom settings cache), then the logic is fired at run time. If, on the other hand, the result of the "if enabled" query is false (based on interrogating the control custom settings cache), then the logic is not fired at run time.

Once configured, the control custom settings cache essentially functions as a reusable "permissions" library which may be updated any time a new user (including an automated user) is added, or when the permissions profile is updated for any user or group of users.

By way of non-limiting example, a typical business process which runs in the background employ use an automated user (AU) to generate and send an invoice to a customer based on a purchase order associated with that customer, and thereafter send a reminder letter if the invoice remains unpaid after a certain period of time. At each step a different business logic feature is executed upon the invoice object by a different user or group, each having a different permission level, role, or responsibility. Consequently, at runtime the system must perform a database inquiry to determine the permission level (and/or other attributes) for the current user in order to execute the business logic. Moreover, the system may unnecessarily perform business logic functions which do not apply to a particular user (e.g., the AU). Unnecessary execution calls can be mitigated using "if-then-else" logic, but this, too, requires changes to the code as new users, profiles, and/or roles are added, and can thus be cumbersome from a development and agility perspective.

In an exemplary embodiment of the present run time control panel, the number of runtime calls and database inquiries (SOQL i/o's) may be reduced by employing a layer of code was devised around the objects that convert the entries into an md5 hash. This hash is stored in a custom setting. Values stored in custom settings can be accessed without having to fire queries because custom settings behave as a persistent hash map.

Standard objects are out of the box, custom objects are user specified/developed. The present run time control panel involves two custom objects: feature set (representing the permissions) and an entity variable value (representing the value of the permissions). The feature set object defines the following: the namespace of the feature, the feature name, and a "maintenance" flag. The namespace provides the ability to disambiguate among multiple features having the same name in the system to be unique across a give name space. The feature name specifies the name of the feature (e.g., account processing). The maintenance flag marks the feature as being under maintenance. The Entity Variable object consists of an entity id and a value. The entity id holds values for a user id, a profile id or the string "default". The value field can hold the values "ON" or "OFF". In other implementations, a look up feature is used to see to which entity a variable belongs The "feature set" object represents highest level (or master level) toggle which allows each feature to enabled or disabled across the entire name space. The "entity variable" object is a child object of the feature set object, and allows individual features to be enabled/disabled at successively higher sub-levels of resolution. In particular, the entity variable object allows individual features to be enabled at the level of an individual user, group, profile, role, or any other desired level of granularity.

Querying the feature set and entity variable custom objects at run time typically consumes a SOQL query, which is a database i/o. To address this problem, the control panel may also include a third custom object, namely, "custom settings", which may be in the form of a cached application layer. More particularly, an MD5 hash entry may be created on the feature set and entity variable data to create respective unique data entries, with the organization level MD5 hash being cached into the application layer. At run time, the system determines the context of the user requesting execution, and interrogates the hash to determine whether the feature to be executed is enabled for the user.

Figure 2:
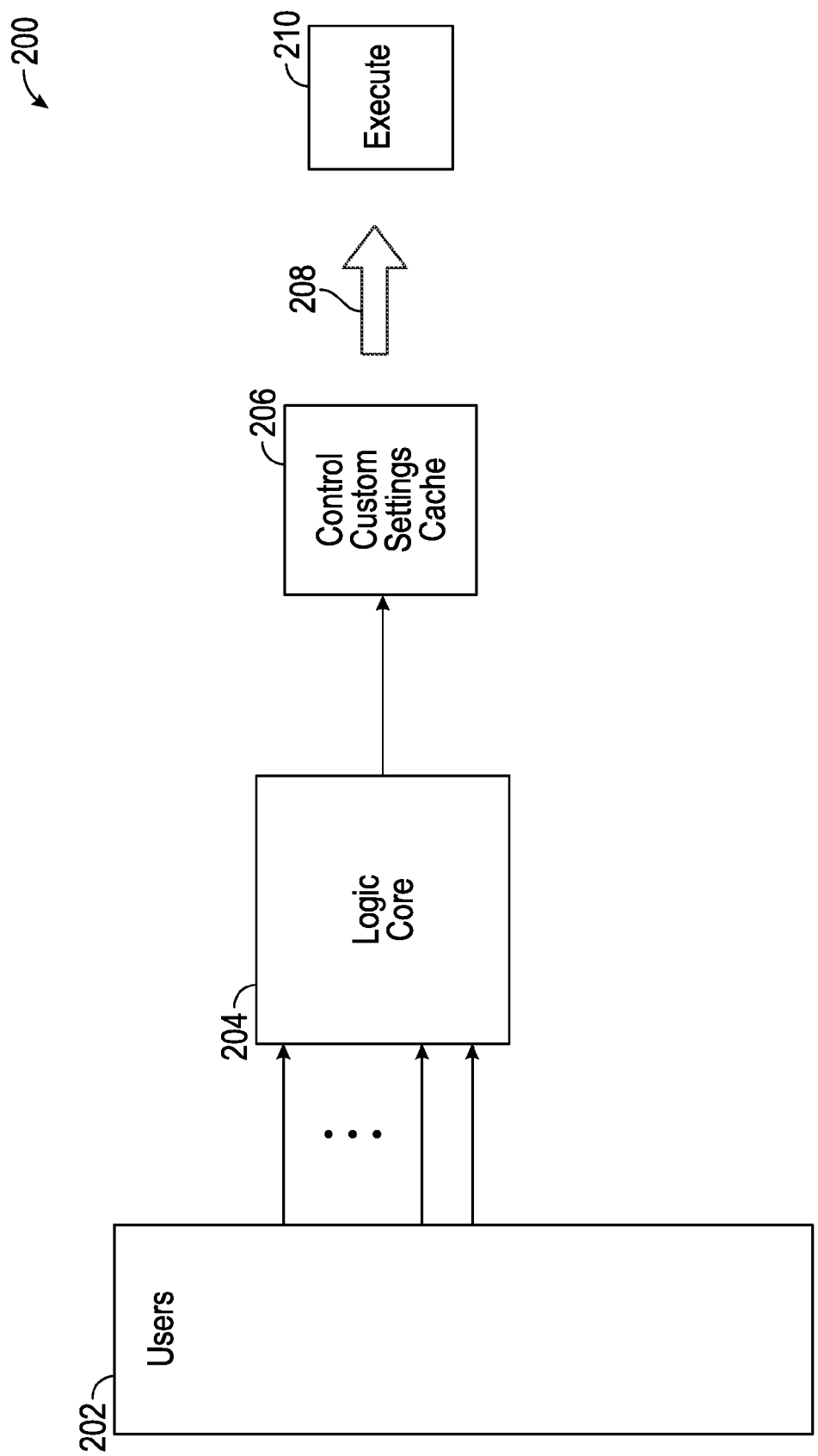
FIG. 2 is a schematic block diagram of a system for controlling the execution of core logic for different user groups using pre-configured cached permissions in accordance with an embodiment.

FIG. 2 is a schematic block diagram of a system 200 for controlling the execution of core logic for different user groups using pre-configured cached permissions in accordance with an embodiment. More particularly, the system 200 includes a plurality of users 202 configured to call upon a business logic core 204 including a plurality of logic blocks, a custom settings cache 206 configured to output a "true" or "false" decision for each user with respect to each logic block, and an execution engine 210.

Figure 3:
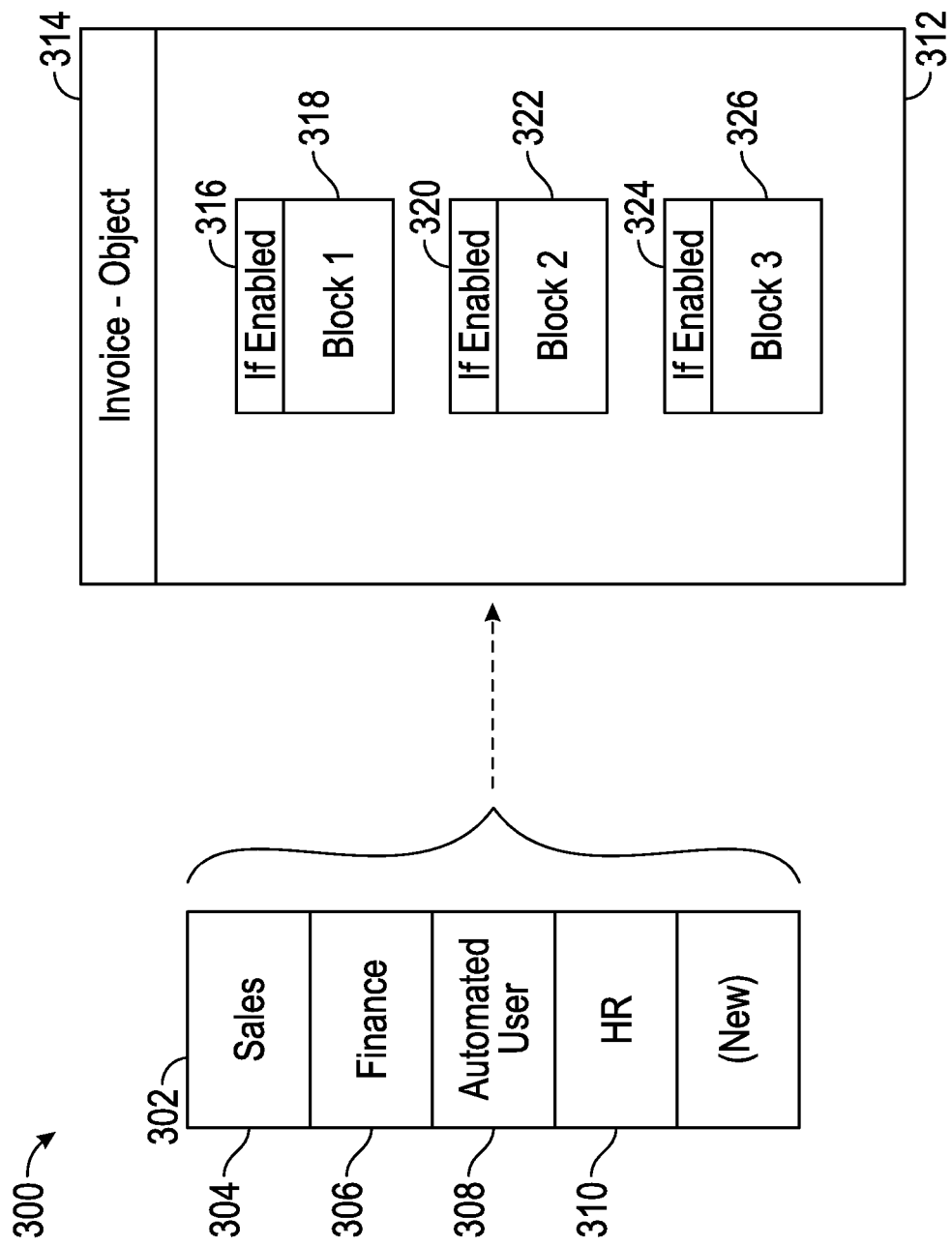
FIG. 3 is a schematic block diagram of a plurality of business logic blocks each having an "if enabled" predicate appended thereto and configured to be acted upon by a plurality of user groups in accordance with an embodiment.

FIG. 3 is a schematic block diagram of a code execution system 300 including a plurality of business logic blocks each having an "if enabled" predicate appended thereto and configured to be acted upon by a plurality of user groups in accordance with an embodiment. More particularly, the code execution system 300 includes a distributed user interface 302 and a core logic module 312 configured to operate on an exemplary object 314 (for example, an invoice). The user interface 302 is configured to facilitate access to the logic module 312 by a plurality of different user groups, profiles, categories, or permission levels within an organization including, for example, a sales group 304, a finance group 306, an automated user 308, a human resources (HR) group 310, and the like.

The logic module 312 includes a plurality of individually executable business logic blocks including a first block 318, a second block 322, and a third block 326. In presently known systems, each logic block includes or has associated therewith a module of enabling logic, referred to herein as "if then" logic. Those skilled in the art will appreciate that the "if then" logic determines which users or user profiles have sufficient permission to execute a particular logic block. This scheme can be cumbersome, however, as it typically requires developers to write specific code to enable existing and new users to execute individual logic blocks, and to revise the enabling code "the "if then" logic) each time a new user is added or an associated permission level changes.

To address this and other issues, each executable module may be equipped with an associated "if enabled" toggle. More particularly and with continued reference to FIG. 3, the first block 318 includes an appended "if enabled" predicate 316, the second block 322 includes an appended "if enabled" predicate 320, and the third block 326 includes an appended "if enabled" predicate 324. In this way, the computationally complex "if then" logic may be replaced with the more straightforward "if enabled" binary inquiry. As described in greater detail below in connection with FIG. 4, the "if enabled" logic is applied to a control custom settings hash stored in the cache associated with the run time computer, which outputs either a "true" or "false" for each binary "if enabled" predicate on a feature by feature basis.

FIG. 4 is a schematic block diagram of an administrative control panel 400 for configuring permissions for user groups and storing them in a control custom settings cache in accordance with an embodiment. More particularly, the control panel 400 includes a parent object module 402 and a child object module 404. The parent object module 402 allows the administrator to define a plurality of attributes associated with the parent object such as, for example, a feature field 406, a name field 408, a namespace field 410, and a maintenance field or flag 412. The child object module 404 allows the administrator to define a plurality of attributes associated with the child object such as, for example, an entity field 414 (e.g., user id, profile id, or a default id applicable to all users), and an entity variable field 416 (e.g., "on" or "off").

With continued reference to FIG. 4, an administrator may interact with the control panel 400 to thereby define permission levels for a plurality of users and user groups on a feature by feature basis. When the administrator "inserts" or "updates" the feature object (e.g., via path 418) or the entity object (e.g., via path 420) using the control panel, the newly updated data is cached at a control custom settings cache 422. In an embodiment, the cache 422 may be in the form of an MD5 hash generated using a message-digest algorithm cryptographic hash function.

Referring again to FIGS. 2-5, when a user 202 attempts to invoke logic core 204, the system interrogates the permissions library stored in the cache 206 to determine if a particular business logic block is enabled for that particular user. If the cache 206 returns "true" at output 208 for that user for the requested feature, the requested block may be execute at runtime by the execution engine 210. If, on the other hand, the cache 206 returns "false" at output 208 for that user for the requested feature, the requested block is not executed.

FIG. 5 is a flow diagram of an exemplary method 500 for turning on and off features at run time in accordance with an embodiment. More particularly, the method 500 includes providing a unique enabling predicate (e.g., an "if enabled" statement) for one or more executable features (blocks of code) (Task 502), configuring a permissions library (Task 504), and caching the configured permissions library (Task 506). The method 500 further includes interrogating the cache with the first "if enabled" predicate (Task 508), executing the block of code (feature) if the cache yields "true" for the requesting user (Task 510), and not executing the code block if the cache yields "false" for the requesting user (Task 512).

Although various embodiments are set forth in the context of a multi-tenant or on-demand environment, the systems and methods described herein are not so limited. For example, the may also be implemented in enterprise, single tenant, and/or stand-alone computing environments.

A method is thus provided for controlling the execution of business logic. The method includes: providing a first enabling predicate for a first code block; configuring a permissions library; caching the permissions library; applying the first enable predicate to the cached permissions library at run time; executing the first code block if the permissions library outputs true for the first enable predicate; and not executing the first code block if the permissions library outputs false for the first enable predicate.

In an embodiment, the first enable predicate comprises an IF ENABLED then execute statement.

In an embodiment, configuring the permissions library comprises defining an on/off state for each of a plurality of users for each of a plurality of features.

The method may also include providing a second enabling predicate for a second code block; applying the second enable predicate to the cached permissions library at run time; and executing the second code block if the permissions library outputs true for the second enable predicate, wherein the cached permissions library is configured to define the on/off state for the first and second code blocks for each of a plurality of users.

In an embodiment, the plurality of users may include one or more of individual users, user groups, and a default user corresponding to all users.

In an embodiment, each feature corresponds to a respective one of the first and second code blocks.

In an embodiment of the method, configuring the permissions library includes: editing permissions for user groups using a control panel interface; and updating the edited permissions to a custom settings cache, wherein updating includes automatically populating the cache upon saving the edited permissions.

In an embodiment, caching the permissions library comprises storing the permissions in the form of an MD5 hash.

In an embodiment, configuring the permissions library may include: displaying an interactive control panel; and populating a custom settings cache based on an administrator's interaction with the control panel.

In an embodiment, configuring the permissions library may include: defining a parent object for the first code block including at least one of a name, a namespace, and a maintenance flag; and defining a child object for the first code block including an entity field and an entity variable.

In an embodiment, the entity field comprises at least one of a user id and a profile id, and the entity variable comprises an on/off field.

A control panel is also provided for controlling the execution of business logic. The control panel includes: a parent object editing module configured to allow an administrator to define a name space for a plurality of features; a child object editing module configured to allow an administrator to define the on/off state for a plurality of user entities for each of the plurality of features; and a custom settings run time cache for storing a permissions library corresponding to the respective on/off states.

Computer code embodied in a non-transitory medium is also provided for operation by a processing system for performing the steps of: providing a first enabling predicate for a first code block; configuring a permissions library; caching the permissions library; applying the first enable predicate to the cached permissions library at run time; and executing the first code block if the permissions library outputs true for the first enable predicate.

In an embodiment, the computer code is configured for operation in a multi-tenant on demand computing environment.

In an embodiment, the computer code may be further configured to: provide a second enabling predicate for a second code block; apply the second enable predicate to the cached permissions library at run time; and execute the second code block if the permissions library outputs true for the second enable predicate; wherein the cached permissions library is configured to define the on/off state for the first and second code blocks for each of a plurality of users.

In an embodiment, configuring the permissions library may include: defining a parent object for the first code block including at least one of a name, a namespace, and a maintenance flag; and defining a child object for the first code block including an entity field and an entity variable.

In an embodiment, configuring the permissions library may include: displaying an interactive control panel; and populating a custom settings cache based on an administrator's interaction with the control panel.

The foregoing description is merely illustrative in nature and is not intended to limit the embodiments of the subject matter or the application and uses of such embodiments. Furthermore, there is no intention to be bound by any expressed or implied theory presented in the technical field, background, or the detailed description. As used herein, the word "exemplary" means "serving as an example, instance, or illustration." Any implementation described herein as exemplary is not necessarily to be construed as preferred or advantageous over other implementations, and the exemplary embodiments described herein are not intended to limit the scope or applicability of the subject matter in any way.

For the sake of brevity, conventional techniques related to computer programming, computer networking, database querying, database statistics, query plan generation, XML and other functional aspects of the systems (and the individual operating components of the systems) may not be described in detail herein. In addition, those skilled in the art will appreciate that embodiments may be practiced in conjunction with any number of system and/or network architectures, data transmission protocols, and device configurations, and that the system described herein is merely one suitable example. Furthermore, certain terminology may be used herein for the purpose of reference only, and thus is not intended to be limiting. For example, the terms "first", "second" and other such numerical terms do not imply a sequence or order unless clearly indicated by the context.

Embodiments of the subject matter may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In this regard, it should be appreciated that the various block components shown in the figures may be realized by any number of hardware, software, and/or firmware components configured to perform the specified functions.

For example, an embodiment of a system or a component may employ various integrated circuit components, e.g., memory elements, digital signal processing elements, logic elements, look-up tables, or the like, which may carry out a variety of functions under the control of one or more microprocessors or other control devices. In this regard, the subject matter described herein can be implemented in the context of any computer-implemented system and/or in connection with two or more separate and distinct computer-implemented systems that cooperate and communicate with one another. That said, in exemplary embodiments, the subject matter described herein is implemented in conjunction with a virtual customer relationship management (CRM) application in a multi-tenant environment.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application. Accordingly, details of the exemplary embodiments or other limitations described above should not be read into the claims absent a clear intention to the contrary.

What is claimed:

1. A method of controlling the execution of business logic that allows features of the business logic to be turned on or off at run time for each particular user entity of a plurality of user entities, wherein each particular user entity is either: an individual user, a user group that corresponds to a specific group of users or users assigned to a profile, or a default value that represents and corresponds to all users, the method comprising:

prior to run time:
  providing, by a system, an object comprising a plurality of code blocks, wherein each code block of the plurality of code blocks corresponds to a particular feature and has an enabling predicate associated with that particular code block;
  configuring a library based on an administrator's interaction with an interactive control panel at a computer of the system, wherein configuring the library comprises:
    defining, for each particular user entity and for each particular code block, an on/off state for each feature of that particular code block via an enabling predicate associated with that particular feature, wherein defining further comprises:
      defining a plurality of first attributes associated with a parent object and a plurality of second attributes associated with a child object,
      the first attributes comprising: a name of a particular code block, a namespace for each feature of that particular code block, and a maintenance flag that is used to override an on/off state for each feature of that particular code block irrespective of the value that is cached in the library for that particular enabling predicate; and
      the second attributes comprising: an entity field having a value that specifies that particular user entity, and an entity variable that comprises an on/off field that defines an on/off state for each feature of that particular code block for that particular user entity; and
  caching the library in a custom settings cache of the system for use at run time; and
then at run time:
  applying, at the system, a first enable predicate associated with a first code block to the cached library to cause the cached library to evaluate either a true result or a false result for the first enable predicate at run time; and
  executing the first code block, at the system, if the library evaluates a true result for the first enable predicate.

2. The method of claim 1, further comprising:
not executing the first code block, at the system, if the library evaluates a false result for the first enable predicate.

3. The method of claim 1, wherein the first enable predicate comprises:
an IF ENABLED then execute code block that corresponds to a particular feature.

4. The method of claim 1, further comprising:
at run time:
  applying, at the system, a second enable predicate associated with a second code block to the cached library to cause the library to evaluate either a true result or a false result for the second enable predicate; and
  executing the second code block, at the system, if the library evaluates a true result for the second enable predicate.

5. The method of claim 1, wherein configuring the library comprises:
editing the library using the interactive control panel interface; and
updating the edited library at the custom settings cache.

6. The method of claim 5, wherein updating comprises automatically populating the cache upon saving the edited library.

7. The method of claim 1, wherein caching the library comprises:
   storing the library in the form of an MD5 hash.

8. The method of claim 1, wherein configuring the library comprises:
   displaying the interactive control panel; and
   populating the custom settings cache based on the administrator's interaction with the interactive control panel.

9. A system comprising:
   a computer having a display configured to display an interactive control panel for controlling the execution of business logic that allows features of the business logic to be turned on or off at run time for each particular user entity of a plurality of user entities based on an administrator's interaction with an interactive control panel, wherein each particular user entity is either: an individual user, a user group that corresponds to a specific group of users or users assigned to a profile, or a default value that represents and corresponds to all users, wherein the interactive control panel comprises:
      a parent object editing module, displayed at the display of the computer, configured to allow an administrator to define for each particular code block, prior to run time, a plurality of first attributes associated with a parent object, the first attributes comprising: a name of a particular code block, a namespace for each feature of that particular code block, and a maintenance flag that is used to override an on/off state for each feature of that particular code block irrespective of the value that is cached in the library for that particular enabling predicate;
      a child object editing module, displayed at the display of the computer, configured to allow an administrator to define for each particular user entity, prior to run time, a plurality of second attributes associated with a child object, the second attributes comprising: an entity field that specifies that particular user entity, and an entity variable that comprises an on/off field that defines an on/off state for each feature of that particular code block for that particular user entity; and
      a server, comprising: a custom settings cache for storing a library for use at run time, the library comprising the plurality of first attributes and the plurality of second attributes.

10. Computer code embodied in a non-transitory medium for operation by a system for performing the steps of:
    prior to run time:
       providing, by the system, an object comprising a plurality of code blocks, wherein each code block of the plurality of code blocks corresponds to a particular feature and has an enabling predicate associated with that particular code block;
       configuring a library based on an administrator's interaction with an interactive control panel at a computer of the system, wherein configuration of the library allow for control of the execution of business logic by allowing features of the business logic to be turned on or off at run time for each particular user entity of a plurality of user entities, wherein each particular user entity is either: an individual user, a user group that corresponds to a specific group of users or users assigned to a profile, or a default value that represents and corresponds to all users, wherein configuring the library comprises:
          defining, for each particular user entity and for each particular code block, an on/off state for each feature of that particular code block via an enabling predicate associated with that particular feature, wherein defining further comprises:
             defining a plurality of first attributes associated with a parent object and a plurality of second attributes associated with a child object,
             the first attributes comprising: a name of a particular code block, a namespace for each feature of that particular code block, and a maintenance flag that is used to override an on/off state for each feature of that particular code block irrespective of the value that is cached in the library for that particular enabling predicate; and
             the second attributes comprising: an entity field having a value that specifies that particular user entity, and an entity variable that comprises an on/off field that defines an on/off state for each feature of that particular code block for that particular user entity; and
       caching the library in a custom settings cache of the system for use at run time; and
    then at run time:
       applying, at the system, a first enable predicate associated with a first code block to the cached library to cause the cached library to evaluate either a true result or a false result for the first enable predicate at run time; and
       executing the first code block, at the system, if the library evaluates a true result for the first enable predicate.

11. The computer code of claim 10 configured for operation in a multi-tenant on demand computing environment.

12. The computer code of claim 10, further configured to:
    at run time:
       apply, at the system, a second enable predicate associated with a second code block to the cached library to cause the library to evaluate either a true result or a false result for the second enable predicate; and
       execute the second code block, at the system, if the library evaluates a true result for the second enable predicate.

13. The computer code of claim 10, wherein configuring the library comprises:
    displaying the interactive control panel; and
    populating the custom settings cache based on an administrator's interaction with the interactive control panel.

* * * * *